(12) United States Patent
Watanabe

(10) Patent No.: US 9,797,476 B2
(45) Date of Patent: Oct. 24, 2017

(54) PLANETARY ROLLER SPEED CHANGER AND ASSEMBLY METHOD AND MOUNTING METHOD FOR THE SAME

(71) Applicant: JTEKT CORPORATION, Osaka-shi, Osaka (JP)

(72) Inventor: Hajime Watanabe, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/355,259

(22) Filed: Nov. 18, 2016

(65) Prior Publication Data

US 2017/0146096 A1 May 25, 2017

(30) Foreign Application Priority Data

Nov. 25, 2015 (JP) ................................. 2015-229503

(51) Int. Cl.
*F16H 1/48* (2006.01)
*F16C 19/16* (2006.01)
*F16C 19/54* (2006.01)

(52) U.S. Cl.
CPC .............. *F16H 1/48* (2013.01); *F16C 19/16* (2013.01); *F16C 19/543* (2013.01); *B65H 2403/481* (2013.01); *F16C 2240/40* (2013.01); *F16C 2324/16* (2013.01)

(58) Field of Classification Search
CPC . F16H 1/48; F16H 13/06; F16H 13/08; F16C 19/16

See application file for complete search history.

(56) References Cited

U.S. PATENT DOCUMENTS

| 4,648,288 | A  | * | 3/1987  | Kato .................... F16H 13/10 |
|           |    |   |         | 475/183                            |
| 6,039,668 | A  | * | 3/2000  | Kolstrup ................ F16H 13/06 |
|           |    |   |         | 475/183                            |
| 8,282,523 | B2 | * | 10/2012 | Inayoshi ............... F16C 27/066 |
|           |    |   |         | 475/183                            |
| 9,239,098 | B2 | * | 1/2016  | Watanabe ............. F16H 57/082  |
| 9,316,303 | B2 | * | 4/2016  | Watanabe ............. F16H 57/082  |
| 2015/0167821 | A1 |  | 6/2015  | Watanabe                           |
| 2015/0184738 | A1 | * | 7/2015  | Watanabe ............... F16H 13/06 |
|           |    |   |         | 475/183                            |
| 2017/0009873 | A1 | * | 1/2017  | Watanabe ........... F16H 57/0486   |

FOREIGN PATENT DOCUMENTS

JP        2015-113931 A        6/2015

* cited by examiner

*Primary Examiner* — Derek D Knight
(74) *Attorney, Agent, or Firm* — Oliff PLC

(57) ABSTRACT

An assembly method for a planetary roller speed changer is provided. The planetary roller speed changer includes a plurality of planetary rollers that is in rolling contact with both an input shaft and a fixed ring and an output shaft supported by a housing and rotating along with the planetary rollers. An assembly apparatus includes an adjustment apparatus that enables positions of the fixed ring and the housing to be adjusted and a measurement apparatus that measures irregularity of rotation of the output shaft. In an assembly step, the fixed ring and the housing are fixed at a position where the irregularity of rotation of the output shaft is minimized.

4 Claims, 6 Drawing Sheets

PLANETARY ROLLER SPEED CHANGER AND ASSEMBLY METHOD AND MOUNTING METHOD FOR THE SAME

INCORPORATION BY REFERENCE

The disclosure of Japanese Patent Application No. 2015-229503 filed on Nov. 25, 2015 including the specification, drawings and abstract, is incorporated herein by reference in its entirety.

BACKGROUND OF THE INVENTION

1. Field of the Invention

The invention relates to a planetary roller speed changer and an assembly method and a mounting method for the planetary roller speed changer, and in particular, to a unit that reduces irregularity of rotation of an output shaft.

2. Description of the Related Art

For a sheet feeding mechanism for a printer or a copier (hereinafter referred to as a "printer or the like"), a feeding speed needs to be precisely controlled in order to improve printing quality. The feeding mechanism is driven by a motor 105 to change the speed of rotation transmitted from the motor to transmit the changed speed. In this case, a planetary roller speed changer 100 is used which allows rotary motion of the motor 105 to be precisely transmitted. As depicted in FIG. 7, in the planetary roller speed changer 100, a plurality of planetary rollers 103 is arranged between a fixed ring 101 and a sun shaft 102 that are arranged coaxially with each other. Revolving motion of the planetary rollers 103 in conjunction with rotation of the sun shaft 102 is output as rotation of a carrier 107 (Japanese Patent Application Publication No. 2015-113931 (JP 2015-113931 A)).

In the planetary roller speed changer 100, if the revolution center of the planetary rollers 103 is misaligned with the rotation center of the carrier 107, the revolution angle of the planetary rollers 103 deviates from the rotation angle of the carrier 107. Thus, even when the sun shaft 102 is rotated at a constant speed and the planetary rollers 103 revolve at a constant speed, the carrier 107 rotates at a varying speed. In this case, accurate transmission of rotation of the motor 105 to the output shaft 108 fails, resulting in a displaced printing position and thus degraded printing quality. Thus, for the printer or the like, coaxiality between the pitch circle center of the planetary rollers 103 and the rotation center of the carrier 107 needs to be approximately 10 μm. "Rotation irregularity" is a phenomenon in which the rotation speed or angle of the output shaft 108 increases or decreases with respect to the rotation speed or angle of the sun shaft 102, which serves as an input shaft.

When the planetary roller speed changer 100 is mounted to the printer or the like (not depicted in the drawings), positioning pins 110 are installed on a mounting surface of the planetary roller speed changer 100 and are fitted into respective pin insertion holes formed in the printer or the like for alignment. However, to allow the planetary roller speed changer 100 to be easily assembled to the printer or the like, a clearance is formed between each of the positioning pins 110 and a corresponding one of the pin insertion holes in the printer or the like when the pins 110 are fitted into the respective holes. Thus, the mounting position of the planetary roller speed changer 100 may be slightly displaced. As a result, the output shaft 108 of the planetary roller speed changer 100 may be misaligned with the input shaft of the printer or the like.

If the above-described misalignment occurs, the output shaft 108 is displaced according to the position of the input shaft of the printer or the like. As a result, the output shaft 108 comes into contact with a deep groove ball bearing and is thus tilted, misaligning the rotation center of the carrier 107 and the revolution center of the planetary rollers 103. This disadvantageously leads to the rotation irregularity.

SUMMARY OF THE INVENTION

An object of the invention is to minimize adverse effects of misalignment of an output shaft of a planetary roller speed changer with respect to an input shaft of a printer or the like and to reduce irregularity of rotation of the output shaft when the planetary roller speed changer is mounted to the printer or the like.

An aspect of the invention provides a planetary roller speed changer mounted to a driven apparatus to transmit rotation of an output shaft to the driven apparatus. The planetary roller speed changer includes an input shaft, a fixed ring arranged radially outward of and coaxially with the input shaft, a plurality of planetary rollers that is in rolling contact with an outer periphery of the input shaft and an inner periphery of the fixed ring, the output shaft that engages with the planetary rollers and that rotates substantially coaxially with the input shaft, and a rolling bearing fixed to the fixed ring to support the output shaft so as to make the output shaft rotatable. The rolling bearing includes an outer ring having an outer-ring raceway surface on an inner periphery of the outer ring, an inner ring having an inner-ring raceway surface on an outer periphery of the inner ring, and a plurality of rolling elements that rolls on the raceway surfaces. A relationship (1) is satisfied between a radial clearance of the rolling bearing and a mounting error involved in mounting of the planetary roller speed changer to the driven apparatus. Radial binding of the output shaft by the rolling bearing is avoided when the planetary roller speed changer is misaligned with the driven apparatus during assembly.

$$Rs > 2 \times C \times B/(A+B) \tag{1}$$

where

Rs: a radial clearance of the rolling bearing,

A: an axial dimension between a shaft end of the output shaft and an axial center of the rolling bearing, B: an axial dimension between the axial center of the rolling bearing and an axial center of each of the planetary rollers, and C: a maximum value of the mounting error.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 5 is an axial sectional view illustrating that the planetary roller speed changer has been mounted to a printer or the like;

DETAILED DESCRIPTION OF EMBODIMENTS

Figure 1:
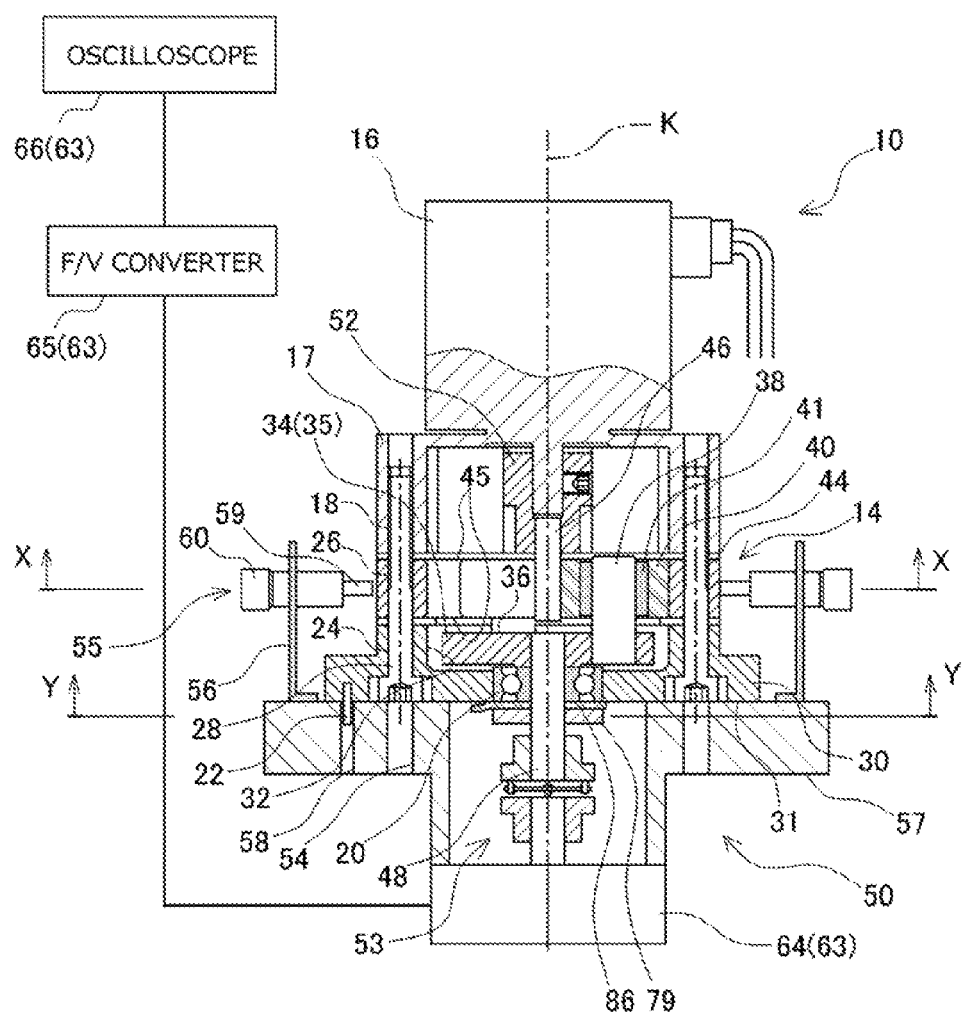
FIG. 1 is an axial sectional view of an assembly apparatus and a planetary roller speed changer in the present embodiment.

An embodiment of an assembly method for a planetary roller speed changer 10 according to the invention (hereinafter referred to as the "present embodiment") will be described below in detail with reference to the attached drawings. FIG. 1 is a diagram depicting a general configuration of an assembly apparatus 50 used in the present embodiment and illustrating that the planetary roller speed changer 10 is being assembled. In the assembly apparatus 50 in the present embodiment, the planetary roller speed changer 10 has a rotation axis K extending in a vertical direction. The direction of the rotation axis K is hereinafter referred to as an axial direction, and a direction orthogonal to the axial direction is hereinafter referred to as a radial direction.

As depicted in FIG. 1, the planetary roller speed changer 10 includes a housing 30, a traction drive unit 14, and a motor 16. The housing 30 and the motor 16 are coaxially assembled to each other with the traction drive unit 14 sandwiched between the housing 30 and the motor 16 in the axial direction. An output shaft 48 of the planetary roller speed changer 10 rotates around the rotation axis K.

Figure 2:
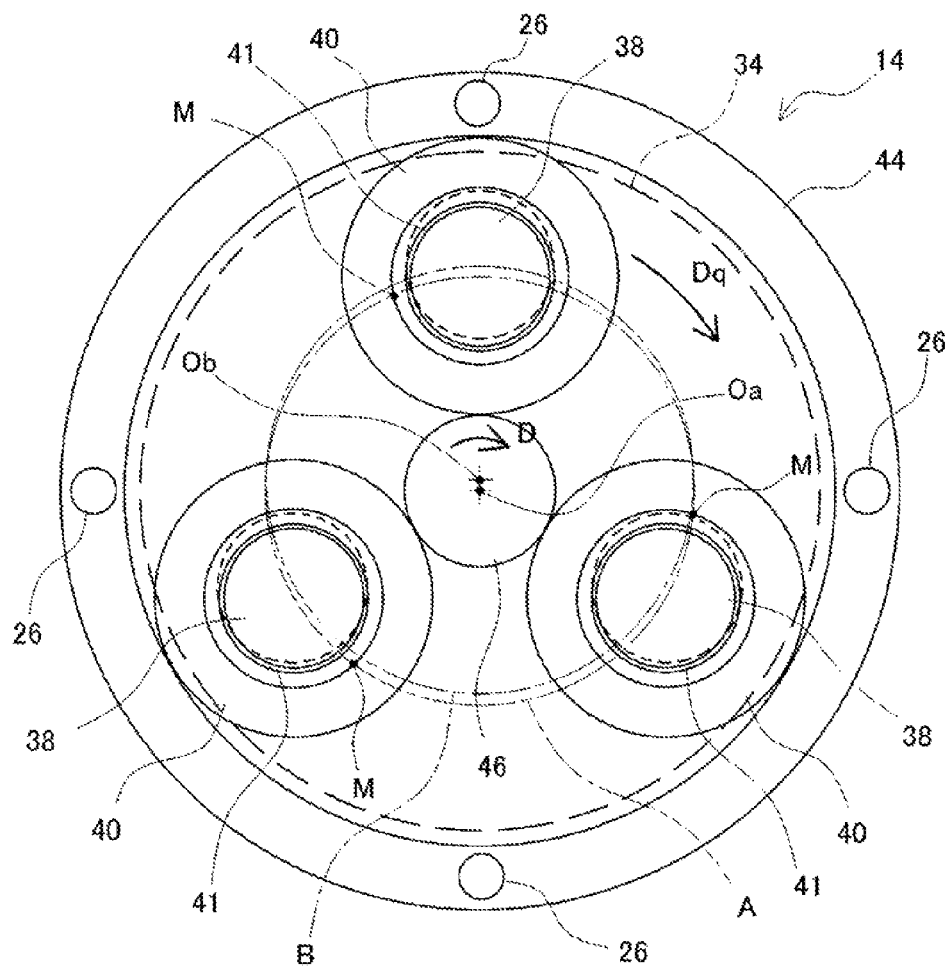
FIG. 2 is a sectional view of the assembly apparatus and the planetary roller speed changer taken at a position X-X in FIG. 1.

First, with reference to FIG. 2, the traction drive unit 14 will be described. FIG. 2 is a sectional view of the traction drive unit 14 taken at a position X-X in FIG. 1. The traction drive unit 14 includes a fixed ring 44, a sun shaft 46 that is an input shaft, a plurality of planetary rollers 40, and a carrier 34.

The fixed ring 44 is shaped like a ring and is produced by quenching and hardening a high-carbon steel such as bearing steel. An outer periphery and an inner periphery of the fixed ring 44 are cylindrical surfaces that are coaxially formed. The inner periphery is finished to have a circular shape by grinding. On opposite sides of the fixed ring 44, side surfaces 45, 45 are formed each of which extends orthogonal to the axial direction. The side surfaces 45, 45 are parallel to each other and finished by grinding. The fixed ring 44 has four bolt holes 26 arranged at regular intervals in a circumferential direction and penetrating the side surface 45 vertically in the axial direction. The bolt holes 26 are formed at positions corresponding to bolt holes 24 in the housing 30 when the traction drive unit 14 and the housing 30 are combined with each other.

The sun shaft 46 is a shaped like a solid cylinder and produced by quenching and hardening high-carbon steel such as bearing steel. An outer periphery of the sun shaft 46 is finished to have a circular shape by grinding. The sun shaft 46 is assembled at a position in the traction drive unit 14 where the sun shaft 46 protrudes in one direction along the axial direction (in FIG. 1, upward in the vertical direction) with respect to the planetary rollers 40. The sun shaft 46 and a rotating shaft of the motor 16 are coupled together via a coupling 52.

The planetary rollers 40 are shaped like cylinders and produced by quenching and hardening high-carbon steel such as bearing steel. Each of the planetary rollers 40 has an inner peripheral surface and an outer peripheral surface that are coaxial cylindrical surfaces. The outer peripheral surface is finished to have a circular shape by grinding. In the traction drive unit 14, three planetary rollers 40 are assembled between the inner periphery of the fixed ring 44 and the outer periphery of the sun shaft 46 at regular intervals in the circumferential direction. Each of the planetary rollers 40 is in rolling contact with the outer periphery of the sun shaft 46 and the inner periphery of the fixed ring 44. The outer peripheral surface of each of the planetary rollers 40 has a diameter dimension slightly larger than a radial dimension between the inner periphery of the fixed ring 44 and the outer periphery of the sun shaft 46. Consequently, the planetary rollers 40 are in contact with the fixed ring 44 and the sun shaft 46 under a predetermined contact pressure. Traction oil is applied to contact surfaces between each planetary roller 40 and the fixed ring 44 and the sun shaft 46. Rotation of the sun shaft 46 allows the planetary rollers 40 to revolve due to a shearing force of the traction oil.

The carrier 34 includes a disc-shaped carrier plate 35 and three driving pins 38. The carrier plate 35 has a pair of parallel circular side surfaces 36 and is produced using aluminum alloy. The driving pins 38 protrude in one direction along the axial direction of the carrier plate 35 and are assembled vertically in the circular side surfaces 36 at an equal distance from the center of each of the circular side surfaces 36 in the radial direction and at regular intervals in the circumferential direction. Each of the driving pins 38 is a solid cylindrical shape and is produced by quenching and hardening high-carbon steel such as bearing steel. An outer periphery of each driving pin 38 is finished to have a circular shape by grinding.

The output shaft 48 is assembled in the carrier plate 35 at the center of each circular side surface 36 of the carrier plate 35 parallel with the driving pins 38, and protrudes in a direction along the axial direction opposite to the direction in which the driving pins 38 protrude. The output shaft 48 is shaped like a solid cylindrical shape and produced using stainless steel. An outer periphery of the output shaft 48 is finished to have a circular shape by grinding.

The three driving pins 38 assembled in the carrier plate 35 are each fitted on an inner periphery of the corresponding planetary roller 40. Thin cylindrical sleeves 41 are each fitted over the outer periphery of the corresponding driving pin 38 in an interference fitting manner. Each of the sleeves 41 is formed of a sintered material with which oil is impregnated. Each planetary roller 40 and the corresponding sleeve 41 are fitted together so as to have a slight clearance between the inner periphery of the planetary roller 40 and the outer periphery of the sleeve 41. Each planetary roller 40 and the corresponding driving pin 38 are rotatable with respect to each other. Thus, the carrier 34 engages with the planetary rollers 40 and rotates around the rotation axis K in conjunction with revolution motion of the planetary rollers 40. In FIG. 2, the size of the clearance between each sleeve 41 fitted over the outer periphery of the corresponding driving pin 38 and the inner periphery of the corresponding planetary roller 40 is exaggerated in order to facilitate understanding of a positional relationship between the driving pin 38 and the planetary roller 40. The sleeves 41 may be formed of a synthetic resin such as a fluorine resin that is excellent in a sliding friction property.

The housing 30 is assembled to the carrier 34 side of the traction drive unit 14. The housing 30 is produced by cutting aluminum alloy. A deep groove ball bearing 20 that is a rolling bearing is assembled to an inner periphery of the housing 30 in an interference fitting manner, to support the output shaft 48 so as to make the output shaft 48 rotatable. A mounting surface 31 of the housing 30 is formed to extend in a direction orthogonal to the rotation axis K. On the mounting surface 31, a plurality of (in the present embodiment, two) positioning pins 22 is provided which protrudes a predetermined distance in the axial direction. A recessed portion 32 is formed on the opposite side of the housing 30 from the mounting surface 31 in the axial direction so that the carrier 34 is housed in the recessed portion 32. In the housing 30, a plurality of bolt holes 24 is formed which penetrates the housing 30 from the mounting surface 31 side in the axial direction. In the present embodiment, four bolt holes 24 are formed at regular intervals in the circumferential direction. An opening of each bolt hole 24 at the mounting surface 31 is spot-faced to prevent a head of a bolt 28 with a hexagon socket from protruding from the mounting surface 31.

Figure 4:
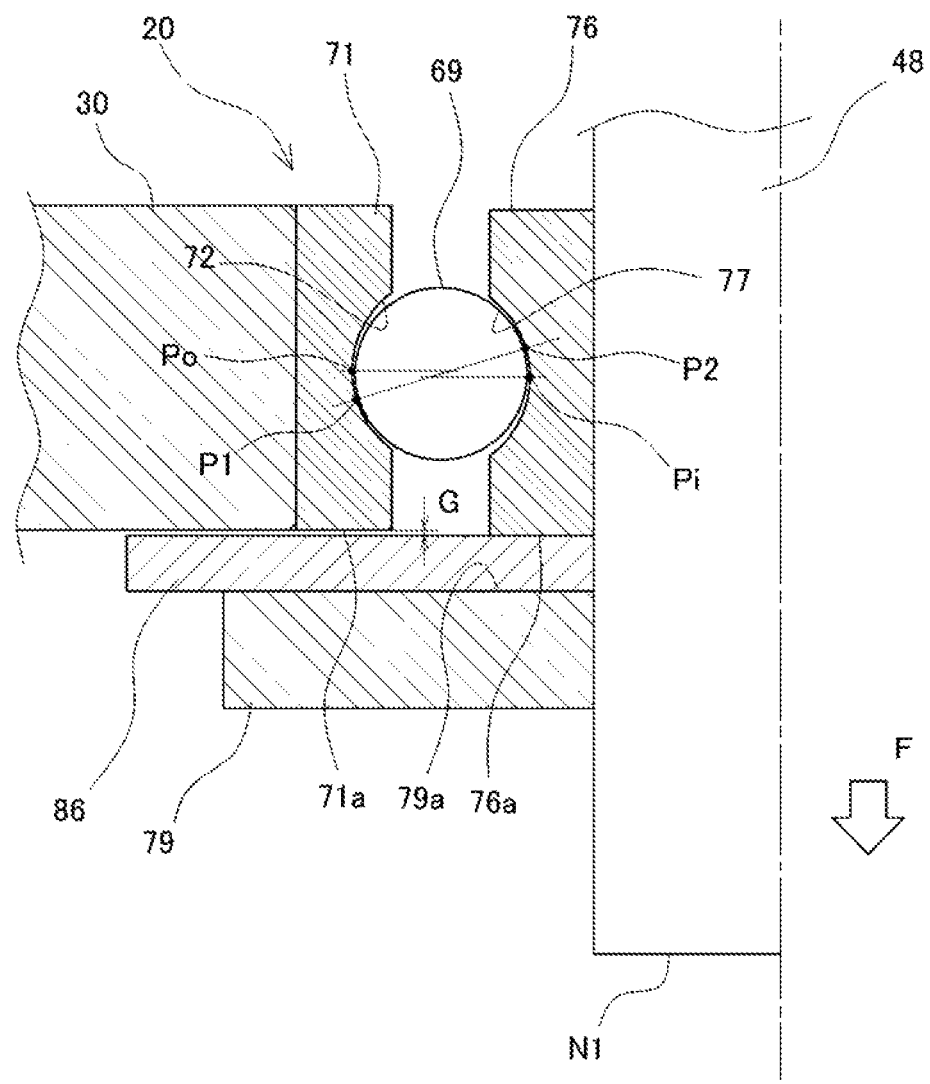
FIG. 4 is an enlarged view of an important part of a portion of the planetary roller speed changer to which a deep groove ball bearing is assembled.

The deep groove ball bearing 20 will be described in detail with reference to FIG. 4. FIG. 4 is an enlarged view of an important part of a portion of FIG. 1 in which the deep groove ball bearing 20 is assembled. The deep groove ball bearing 20 includes an outer ring 71, an inner ring 76, and a plurality of balls 69 corresponding to rolling elements. An outer-ring raceway surface 72 with a circular-arc-shaped axial section is formed on an inner periphery of the outer ring 71. An inner-ring raceway surface 77 with a circular-arc-shaped axial section is formed on an outer periphery of the inner ring 76. The balls 69 roll on the raceway surfaces 72, 77. When an end surface 71a of the outer ring 71 is arranged flush with an end surface 76a of the inner ring 76, the outer ring 71 and the inner ring 76 are assembled together such that a raceway bottom Po (a point with the maximum bore diameter dimension) of the outer-ring raceway surface 72 and a raceway bottom Pi (a point with the minimum outside diameter dimension) of the inner-ring raceway surface 77 face each other in the radial direction.

The deep groove ball bearing 20 has a radial clearance Rs with a predetermined size. The radial clearance Rs has a size sufficient to allow the inner ring 76 to be displaced in the radial direction with respect to the outer ring 71, and is defined by Expression (1).

$$Rs=(Do-Di)-2 \times Db \qquad (1)$$

The bore diameter dimension of the outer-ring raceway surface 72 at the raceway bottom Po is denoted by Do. The bore diameter dimension of the inner-ring raceway surface 77 at the raceway bottom Pi is denoted by Di. The diameter of each of the balls 69 is denoted by Db. The size of the radial clearance Rs will be described in detail.

Figure 3:
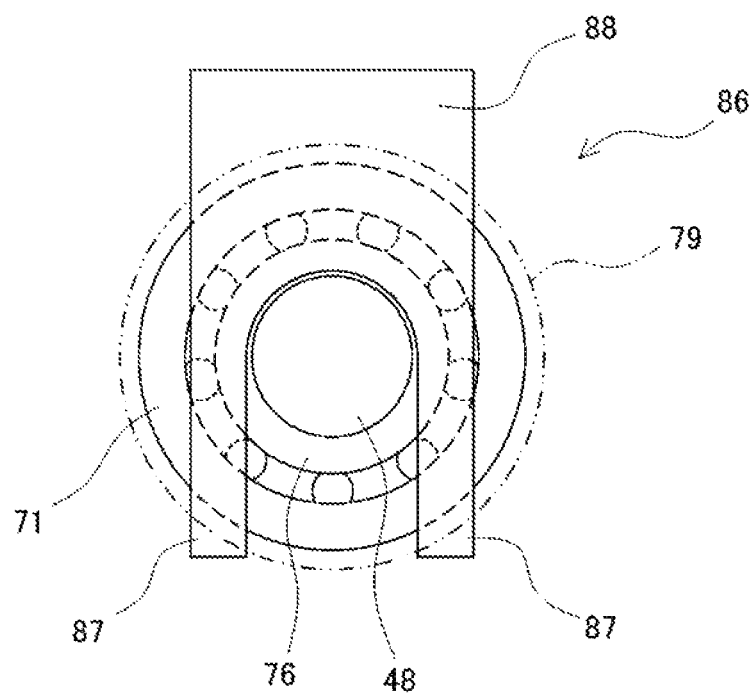
FIG. 3 is a sectional view of the assembly apparatus and the planetary roller speed changer taken at a position Y-Y in FIG. 1 and illustrating a cause of rotation irregularity.

The output shaft 48 is assembled to an inner periphery of the deep groove ball bearing 20 in an interference fitting manner. The output shaft 48 protrudes from the deep groove ball bearing 20 in the axial direction, and a positioning member 79 is assembled to the protruding output shaft 48. The positioning member 79 is assembled to the output shaft 48 in an interference fitting manner. A spacer 86 is inserted between the positioning member 79 and the deep groove ball bearing 20. FIG. 3 is a schematic diagram of the deep groove ball bearing 20 as viewed at a position Y-Y in FIG. 1 in the direction of arrows along the axial direction. As depicted in FIG. 3, the spacer 86 is shaped like a generally rectangular band and has a U-shaped cutout at one end of the spacer 86 in a longitudinal direction thereof. On opposite sides of the cutout in a width direction thereof, legs 87, 87 are formed which extend from a band-like portion 88 so as to be bifurcated. The two legs 87, 87 are inserted over the output shaft 48 and assembled to the output shaft 48 such that the output shaft 48 is located at the most inward position of the cutout. The spacer 86 is produced using a thin stainless steel plate such as a shim material or a synthetic resin such as a polyamide resin. The thickness of the spacer 86 is larger than an axial clearance As of the deep groove ball bearing 20. The axial clearance As has a size enough to allow the inner ring 76 to be displaced in the axial direction with respect to the outer ring 71. With the spacer 86 held at the above-described position, the positioning member 79 is assembled to the output shaft 48 from the shaft end side. The legs 87, 87 are sandwiched between the positioning member 79 and the end surface 76a of the inner ring 76.

The motor 16 is assembled on the opposite side of the traction drive unit 14 from the housing 30 in the axial direction. The motor 16 includes a mounting flange 17 in which four threaded holes 18 are formed at regular intervals in the circumferential direction.

Thus, in the planetary roller speed changer 10, the housing 30, the traction drive unit 14, and the motor 16 are assembled together in this order in the axial direction from the lower part to the upper part in FIG. 1, with the bolt holes 24, 26 aligned with the threaded holes 18 in the motor 16. The bolts 28 with hexagon sockets are screwed into the threaded holes 18 in the motor 16 so as to penetrate the bolt holes 24, 26. The housing 30, the traction drive unit 14, and the motor 16 are thus integrally fixed together to form the planetary roller speed changer 10. The deep groove ball bearing 20 is thus fixed to the fixed ring 44 of the traction drive unit 14 via the housing 30 to support the output shaft 48 so as to make the output shaft 48 rotatable.

A cause of possible irregularity of rotation of the output shaft 48 will be explained using FIG. 2. In FIG. 2, misalignment of each driving pin 38 with respect to the corresponding planetary roller 40 in the radial direction is depicted by a dashed line. A pitch circle in the description below refers to a virtual circle formed by joining axes of the driving pins 38 or the planetary rollers 40 together on a plane orthogonal to the axis of the output shaft 48. A pitch circle of driving pins 38 obtained when no misalignment occurs is referred to as a pitch circle A. A pitch circle obtained when misalignment occurs is referred to as a pitch circle B. The center of the pitch circle A is referred to as a pitch circle center Oa. The center of the pitch circle B is referred to as a pitch circle center Ob. Each sleeve 41 is press-fitted over the outer periphery of the corresponding driving pin 38 and moves integrally with the driving pin 38. To avoid complication of the description, the outer periphery of the sleeve 41 fitted over the outer periphery of the corresponding driving pin 38 is hereinafter simply referred to as the outer periphery of the driving pin 38.

As depicted by continuous lines in FIG. 2, the pitch circle center Ob of the driving pins 38 is arranged coaxially with the pitch circle center Oa of the planetary rollers 40. In this case, for example, the sun shaft 46 rotates clockwise (in the direction of arrow D in FIG. 2). At this time, the planetary rollers 40 revolve in a direction depicted by an arrow Dq and thus each come into contact with the corresponding driving pin 38 at a point M on the pitch circle A. In this case, during revolution of the planetary rollers 40, the contact position between the inner periphery of each planetary roller 40 and the outer periphery of the corresponding driving pin 38 remains unchanged. As a result, the carrier 34 rotates in phase with the planetary rollers 40. Consequently, the rotation angle of the output shaft 48 is prevented from deviating from the rotation angle of the sun shaft 46 resulting from a reduction in the rotation speed of the sun shaft 46 in a specific reduction ratio R.

The specific reduction ratio R of the planetary roller speed changer 10 is determined based on the dimensions of components of the traction drive unit 14. When the rotation speed of the sun shaft 46 is denoted by Ni, the rotation speed No of the output shaft 48 is indicted by Expression (2), and thus, the specific reduction ratio R is expressed by Expression (3).

$$No = d \times Ni/(d+D) \qquad (2)$$

$$R = No/Ni = d/(d+D) \qquad (3)$$

The outside diameter dimension of the sun shaft 46 is denoted by d. The bore diameter dimension of the fixed ring 44 is denoted by D.

In contrast, as denoted by dashed lines in FIG. 2, the pitch circle center Ob of the driving pins 38 is misaligned with the pitch circle center Oa of the planetary rollers 40. In this case (in FIG. 2, upward misalignment), each planetary roller 40 and the corresponding driving pin 38 come into contact with each other at a position outward or inward of the point M in the radial direction. This contact position varies according to the position of the planetary rollers 40 around the rotation axis K. This leads to a difference in revolution angle between the planetary rollers 40 and the driving pins 38. The revolution angle refers to an angle by which the planetary rollers 40 move in the circumferential direction around the rotation axis K (coinciding with the pitch circle center Oa of the planetary rollers 40). Thus, even if the sun shaft 46 rotates at a constant rotation speed, while the planetary rollers 40 revolve at a constant speed, the rotation speed of the carrier 34 periodically increases or decreases. This makes the rotation of the output shaft 48 irregular.

As described above, the pitch circle B of the driving pins 38 is misaligned with the pitch circle A of the planetary rollers 40 in the radial direction. In this case, even when the planetary rollers 40 revolve at a constant speed, the rotation speed of the output shaft 48 fluctuates. As a result, for example, in the printer or the like, the position of print sheets may be displaced to degrade printing quality.

With reference to FIG. 1, an assembly method for the planetary roller speed changer 10 will be described. The assembly method includes a measurement step and an assembly step. The measurement step involves measuring the irregularity of rotation of the output shaft 48. The assembly step involves assembling the planetary roller speed changer 10 while adjusting the position of the carrier 34 using measurement results for the rotation irregularity obtained in the measurement step.

In the assembly step, the planetary roller speed changer 10 is assembled with the irregularity of rotation of the output shaft 48 measured.

The assembly apparatus 50 includes a support stand 57 to which the planetary roller speed changer 10 is fixed and an adjustment apparatus 55 that adjusts the position of the carrier 34. The planetary roller speed changer 10 is mounted on the support stand 57. A rotary encoder 64 is arranged on the opposite side of the support stand 57 from the planetary roller speed changer 10 and coaxially with the planetary roller speed changer 10 and coupled to the output shaft 48 via couplings 53.

With reference to FIG. 4, an assembly method for the deep groove ball bearing 20 in the assembly step will be described. In the assembly step, after the rotary encoder 64 and the output shaft 48 are coupled together, the rotary encoder 64 is displaced away from the output shaft 48 in the axial direction. Consequently, the output shaft 48 is biased downward in FIG. 4. The couplings 53 are coupled together via a flexible metal plate. The metal plate is elastically bendable in the direction of the rotation axis K. This elasticity causes a force F to act on the inner ring 76 of the deep groove ball bearing 20 in the direction depicted by an arrow in FIG. 4.

The deep groove ball bearing 20 has a radial clearance Rs. Thus, the force F displaces the inner ring 76 with respect to the outer ring 71 in the axial direction to form a clearance G between the spacer 86 and the end surface 71a of the outer ring 71. At this time, in the deep groove ball bearing 20, each of the balls 69 contacts the outer-ring raceway surface 72 and the inner-ring raceway surface 77 at points P1 and P2, respectively, that lie away from respective raceway centers in the axial direction. The size of the clearance G is half the axial clearance As. The inner ring 76 is thus pressed against the outer ring 71 via the balls 69. In the deep groove ball bearing 20, the inner ring 76 and the outer ring 71 are assembled together with the radial clearance Rs substantially eliminated.

In the assembly apparatus 50, four adjustment apparatuses 55 are installed around the fixed ring 44 to allow the positions of the carrier 34 and the planetary rollers 40 to be adjusted. Arrangement of the adjustment apparatuses 55 is not illustrated. Two sets each of two adjustment apparatuses 55 are arranged to face each other in the radial direction so as to cross each other at right angles. Each of the adjustment apparatuses 55 is fixed to the support stand 57 via a mount 56.

A spindle 59 protrudes from each of the adjustment apparatuses 55 toward the planetary roller speed changer 10. A leading end of the spindle 59 is in abutting contact with the outer periphery of the fixed ring 44 in the radial direction. The adjustment apparatus 55 has a fine feeding mechanism formed using a precision screw or a differential screw with a thread pitch of approximately 0.5 mm. The spindle 59 is precisely extended and contracted in the axial direction by rotating an adjustment dial 60 at a shaft end of the spindle 59. In this step, the fixed ring 44 can be displaced to any position in the radial direction because the bolts 28 with hexagon sockets have been loosely tightened. The four adjustment apparatuses 55 are thus operated as needed to allow the positions of the planetary rollers 40 to be adjusted.

Pin insertion holes 58 which penetrate in the axial direction are formed in the support stand 57 at positions corresponding to the respective positioning pins 22 of the housing 30. The planetary roller speed changer 10 is mounted by inserting the positioning pins 22 into the respective pin insertion holes 58 in the support stand 57. Each of the pin insertion holes 58 and the corresponding positioning pins 22 are fitted together so as to form only a very small clearance between the hole 58 and the pin 22. This prevents the housing 30 and the support stand 57 from being misaligned with each other. In the present embodiment, the force F is exerted on the output shaft 48 to substantially eliminate the radial clearance Rs of the deep groove ball bearing 20. Since the carrier 34 is supported by the housing 30 via the deep groove ball bearing 20, the position of the carrier 34 is fixed with respect to the support stand 57.

As described above, the adjustment apparatuses 55 are operated to displace the fixed ring 44 in the radial direction to adjustably align the carrier 34 with each planetary roller 40.

In the measurement step, the irregularity of rotation of the output shaft 48 is measured using a measurement apparatus 63. The measurement apparatus 63 includes the rotary encoder 64, an F/V converter 65, and an oscilloscope 66. The irregularity of rotation of the output shaft 48 is measured by converting the period of an electric pulse signal transmitted from the rotary encoder 64 into an electric signal corresponding to the frequency of the pulse signal using the F/V converter 65. An electric signal output by the F/V converter 65 can be displayed using a display apparatus such as the oscilloscope 66.

In the present embodiment, the irregularity of rotation of the output shaft 48 is measured by sequentially varying the position of the deep groove ball bearing 20 in the radial direction while checking display on the oscilloscope 66. The planetary roller speed changer 10 is assembled at a position with the rotation irregularity minimized. Tool holes 54 that penetrate in the axial direction are formed in the support stand 57 at positions corresponding to the respective bolts 28 with hexagon sockets. The size of each of the tool holes 54 is sufficient to allow a tightening tool to be inserted into the tool hole 54. The planetary roller speed changer 10 can be assembled by tightening the bolts 28 with hexagon sockets so as to minimize the rotation irregularity. The planetary roller speed changer 10 can thus be assembled so as to accurately align the carrier 34 with each of the planetary rollers 40 to reduce the rotation irregularity of the output shaft 48.

In the present embodiment, the axial force F is exerted on the output shaft 48 to eliminate the radial clearance Rs of the deep groove ball bearing 20. However, when the planetary roller speed changer 10 is installed with the rotation axis K facing the vertical direction, the weights of the couplings 53 and the carrier 34 act on the output shaft 48. Thus, the output shaft 48 is displaced downward in the vertical direction due to the weight of the output shaft 48. When the output shaft 48 has a sufficiently large weight, a biasing apparatus that biases the output shaft 48 in the axial direction needs not be provided.

Figure 5:
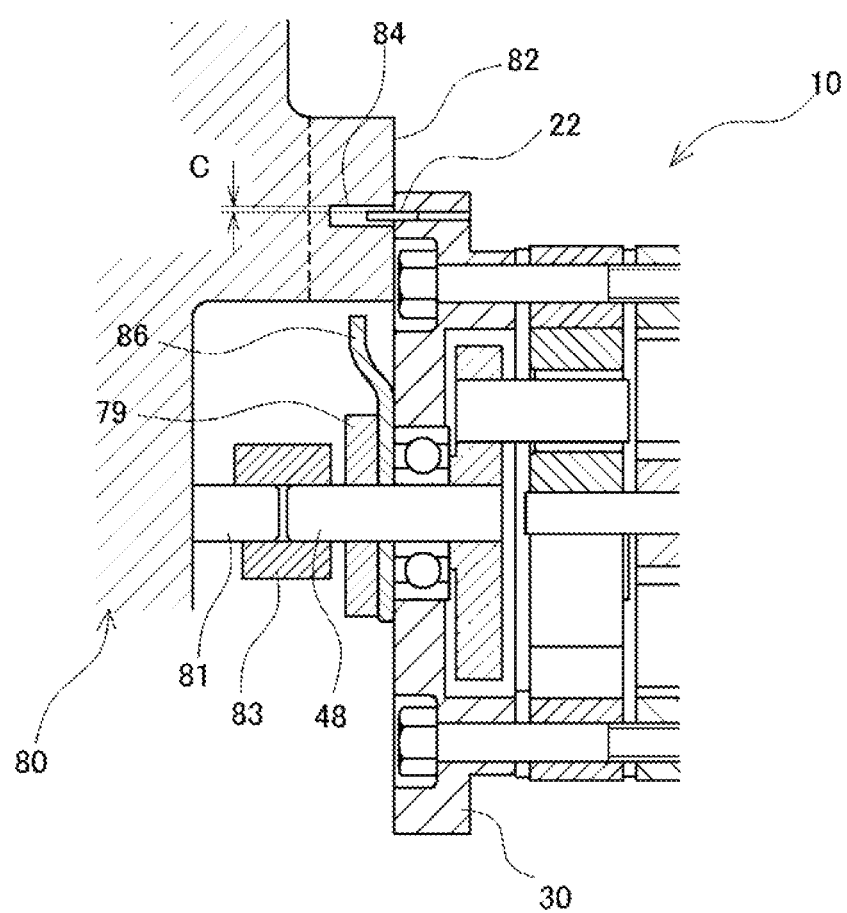

Now, with reference to FIG. 5, a mounting method will be described in which the planetary roller speed changer 10 assembled by the above-described assembly method is mounted to a printer or the like 80. FIG. 5 is an axial sectional view illustrating the planetary roller speed changer 10 assembled by the assembly method in the present embodiment has been mounted to the printer or the like 80 which is a driven apparatus.

Pin insertion holes 84 are formed in a mounting surface 82 of the printer or the like 80 to receive the respective positioning pins 22. To allow the planetary roller speed changer 10 to be mounted, the positioning pins 22 provided on the housing 30 are fitted into the respective pin insertion holes 84. The bore diameter dimension of each of the pin insertion holes 84 is sufficient to facilitate installation and removal of the planetary roller speed changer 10. Thus, the bore diameter dimension of each of the pin insertion holes 84 is set to be approximately 20 μm larger than the outside diameter dimension of each of the positioning pins 22. In FIG. 5, the size of the clearance between the pin insertion hole 84 and the positioning pin 22 is exaggerated.

The size C of the clearance between the positioning pin 22 and the pin insertion hole 84 is a dimension represented by Expression (4).

$$C=(Dp1-Dp2)/2 \quad (4)$$

The bore diameter dimension of each pin insertion hole 84 is denoted by Dp1. The outside diameter dimension of each positioning pins 22 is denoted by Dp2. As described above, a clearance is present between the positioning pin 22 and the pin insertion hole 84. Consequently, when the planetary roller speed changer 10 is mounted, the positioning pin 22 is allowed to move in any direction inside the pin insertion hole 84. Thus, the mounting position of the planetary roller speed changer 10 may be displaced in the radial direction with respect to the printer or the like 80. An amount by which the mounting position is displaced in the radial direction is referred to as a mounting error. The maximum value of the mounting error is C.

In the present embodiment, the planetary roller speed changer 10 is mounted to the printer or the like 80 with the output shaft 48 biased rightward in FIG. 5 to keep the spacer 86 in abutting contact with the end surface 71a of the outer ring 71. In this state, the output shaft 48 of the planetary roller speed changer 10 and an input shaft 81 of the printer or the like 80 are coupled together via couplings 83 so as to transmit rotation of the output shaft 48 to the printer or the like 80.

Since the spacer 86 is supported by the flat-plate-like positioning member 79, when the spacer 86 comes into abutting contact with the end surface 71a of the outer ring 71, assembly is achieved at a position where the end surface 71a of the outer ring 71 is flush with the end surface 76a of the inner ring 76. The position where the end surface 71a of the outer ring 71 is flush with the end surface 76a of the inner ring 76 corresponds to a state where the clearance G is eliminated in FIG. 4.

In the mounting method in the present embodiment, in the above-described state, the spacer 86 is removed. A side surface 79a of the positioning member 79 that comes into contact with the spacer 86 and the end surfaces 76a and 71a of the inner and outer rings 76 and 71 are each a flat surface formed in the radial direction. Thus, the spacer 86 can be easily pulled out by gripping and biasing the band-like portion 88 outward in the radial direction. When the spacer 86 is thus removed, the end surface 71a of the outer ring 71 is flush with the end surface 76a of the inner ring 76. Consequently, in the deep groove ball bearing 20, the raceway bottom Po of the outer-ring raceway surface 72 and the raceway bottom Pi of the inner-ring raceway surface 77 face each other in the radial direction. Thus, radial displacement of the inner ring 76 can be maximized. In this case, the allowable displacement of the inner ring 76 with respect to the outer ring 71 is in any direction along the radial direction from the position where the outer ring 71 and the inner ring 76 are arranged coaxially with each other, and the allowable maximum magnitude of the displacement is half of the radial clearance Rs.

Figure 6:
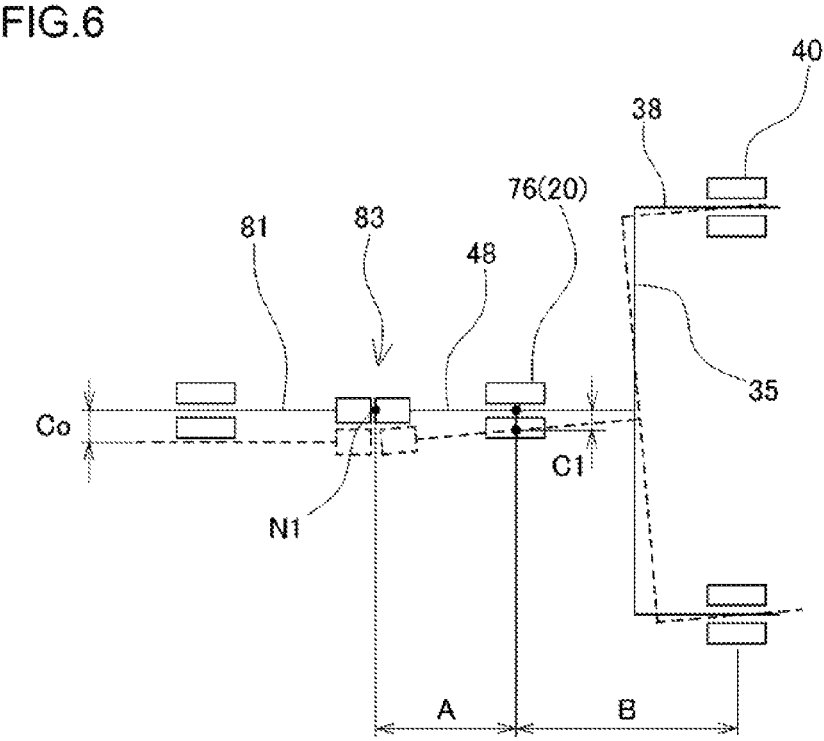
FIG. 6 is a diagram illustrating displacement of a carrier resulting from a mounting error.
Figure 7:
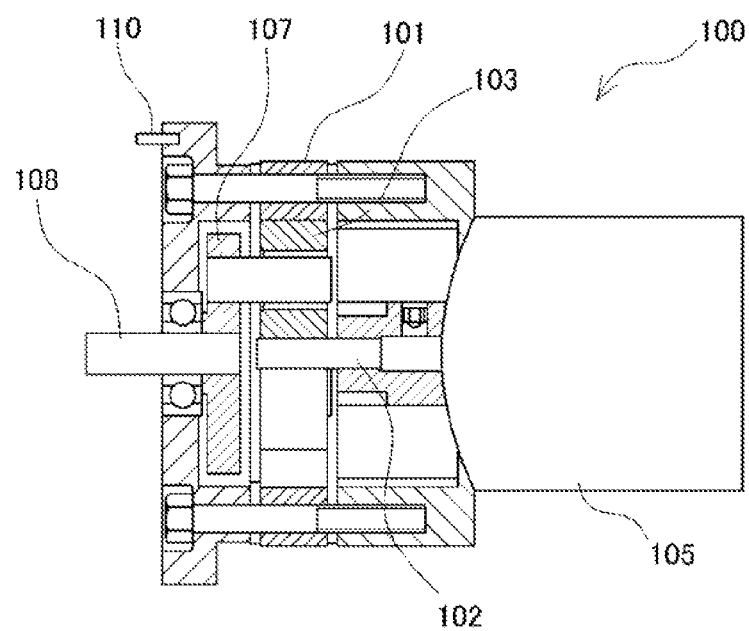
FIG. 7 is a sectional view of a conventional planetary roller speed changer.

A case will be described where the planetary roller speed changer 10 is misaligned by Co (Co<C) in the radial direction as a result of the clearance between each pin insertion hole 84 and the corresponding positioning pin 22, that is, a case will be described where the planetary roller speed changer 10 is mounted to the printer or the like 80 with the mounting error Co. FIG. 6 is a diagram illustrating displacement of the carrier 34 resulting from a mounting error. A continuous line represents a state where the output shaft 48 of the planetary roller speed changer 10 and the input shaft 81 of the printer or the like 80 are coaxially arranged. A dashed line represents a state where the output shaft 48 and the input shaft 81 are misaligned with each other by Co in the radial direction. For convenience of the description below, the axial dimension between a shaft end N1 of the output shaft 48 and the axial center of the deep groove ball bearing 20 is denoted by A, and the axial dimension between the axial center of the deep groove ball bearing 20 and the axial center of the planetary rollers 40 is denoted by B, as depicted in FIG. 6.

The output shaft 48 is coaxially coupled to the input shaft 81 of the printer or the like 80 via the couplings 83. Thus, the shaft end Ni of the output shaft 48 is displaced by Co in the radial direction along with the input shaft 81. The inner ring 76 is fixed to the output shaft 48 and is thus displaced in the radial direction along with the output shaft 48. When the pitch circle center of each driving pin 38 is coaxial with the pitch circle center of the corresponding planetary roller 40, the displacement C1 of the inner ring 76 in the radial direction is expressed by Expression (5).

$$\text{Displacement } C1 = Co \times B/(A+B) \tag{5}$$

If the radial clearance Rs of the deep groove ball bearing 20 is larger than double the displacement C1, the inner ring 76 and the outer ring 71 are prevented from coming into close contact with each other in the radial direction via the balls 69 when the inner ring 76 is displaced by a displacement C1 in the radial direction. Therefore, even if misalignment results from a mounting error when the planetary roller speed changer 10 is mounted to the printer or the like 80, the output shaft 48 displaced in the radial direction is prevented from being bound by the deep groove ball bearing 20.

In the present embodiment, the maximum value of the mounting error is C. Therefore, the radial clearance Rs of the deep groove ball bearing 20 is set larger than double the displacement of the inner ring 76 in the radial direction when the mounting error is C. Consequently, radial binding of the output shaft 48 by the deep groove ball bearing 20 can be reliably avoided. Thus, in the present embodiment, the radial clearance Rs of the deep groove ball bearing 20 is set to a value at which the radial clearance Rs has a relationship with the mounting error expressed by:

$$Rs > 2 \times C \times B/(A+B) \tag{6}$$

where

Rs: radial clearance of the deep groove ball bearing 20,

A: axial dimension between the shaft end N1 of the output shaft 48 and the axial center of the deep groove ball bearing 20, B: axial dimension between the axial center of the deep groove ball bearing 20 and the axial center of each planetary roller 40, and C: maximum value of the mounting error.

Thus, the output shaft 48 can rotate without being bound by the deep groove ball bearing 20. Consequently, even if misalignment results from a mounting error when the planetary roller speed changer 10 is mounted to the printer or the like 80, the pitch circle A of each planetary roller 40 can be made coaxial with the pitch circle B of the corresponding driving pin 38. Therefore, a possible increase in the irregularity of rotation of the output shaft 48 is prevented.

Thus, in the assembly method in the invention, even if misalignment results from a mounting error when the planetary roller speed changer 10 is mounted to the printer or the like 80, the irregularity of rotation of the output shaft 48 of the planetary roller speed changer 10 can be minimized.

In the present embodiment, when the planetary roller speed changer 10 is mounted to the printer or the like 80, the positioning pins 22 are fitted into the respective pin insertion holes 84 to align the planetary roller speed changer 10 with the printer or the like 80. Any other unit may be used to align the planetary roller speed changer 10 with the printer or the like 80. For example, the alignment may be achieved by forming, on the mounting surface 31 of the housing 30, a circular protruding portion centered around the rotation axis K, forming a circular recessed portion in the mounting surface 82 of the printer or the like 80 so that the protruding portion is housed in the recessed portion, and fitting the protruding portion and the recessed portion together. In this case, the mounting error is half the difference in diameter dimension between the protruding portion and the recessed portion. In the present embodiment, the output shaft 48 is supported by the deep groove ball bearing 20. However, the invention is not limited to this. Instead of the deep groove ball bearing, an angular ball bearing or a tapered roller bearing may be used.

In the planetary roller speed changer and the assembly method and the mounting method for the planetary roller speed changer according to the invention, even if misalignment results from a mounting error when the planetary roller speed changer is mounted to the printer or the like, the irregularity of rotation of the output shaft of the planetary roller speed changer can be minimized.

What is claimed is:

1. A planetary roller speed changer mounted to a driven apparatus to transmit rotation of an output shaft to the driven apparatus, the planetary roller speed changer comprising:
    an input shaft;
    a fixed ring arranged radially outward of and coaxially with the input shaft;
    a plurality of planetary rollers that is in rolling contact with an outer periphery of the input shaft and an inner periphery of the fixed ring;
    the output shaft engages with the planetary rollers and rotates substantially coaxially with the input shaft; and
    a rolling bearing fixed to the fixed ring to support the output shaft so as to make the output shaft rotatable, wherein
    the rolling bearing includes an outer ring having an outer-ring raceway surface on an inner periphery of the outer ring, an inner ring having an inner-ring raceway surface on an outer periphery of the inner ring, and a plurality of rolling elements that rolls on the raceway surfaces,
    a relationship (1) is satisfied between a radial clearance of the rolling bearing and a mounting error involved in mounting of the planetary roller speed changer to the driven apparatus, and
    radial binding of the output shaft by the rolling bearing is avoided when the planetary roller speed changer is misaligned with the driven apparatus during assembly, $$Rs > 2 \times C \times B/(A+B) \tag{1}$$

where

Rs: a radial clearance of the rolling bearing,

A: an axial dimension between a shaft end of the output shaft and an axial center of the rolling bearing, the shaft end of the output shaft being an end of the output shaft that is furthest away from the plurality of planetary rollers;

B: an axial dimension between the axial center of the rolling bearing and an axial center of each of the planetary rollers, and C: a maximum value of the mounting error.

2. The planetary roller speed changer according to claim 1, further comprising:
    a positioning member externally fitted over the output shaft in an interference fitting manner; and
    a spacer sandwiched between an end surface of the inner ring and the positioning member in an axial direction and that is pulled out in a radial direction, wherein
    when the spacer comes into contact with the end surface of the outer ring, a raceway bottom of the outer-ring raceway surface and a raceway bottom of the inner-ring raceway surface face each other in the radial direction.

3. An assembly method for the planetary roller speed changer according to claim 2, the assembly method comprising:

measuring irregularity of rotation of the output shaft using an assembly apparatus including an adjustment apparatus that adjusts a position of the rolling bearing in a radial direction with respect to the fixed ring and a measurement apparatus that measures the irregularity of rotation of the output shaft, by biasing the inner ring toward the spacer in the axial direction to bring the rolling elements into contact with the outer-ring raceway surface and the inner-ring raceway surface, and with the rolling elements in contact with the outer-ring raceway surface and the inner-ring raceway surface, sequentially varying the position of the rolling bearing in the radial direction; and assembling the planetary roller speed changer by fixing the fixed ring and the rolling bearing together at a position where the rotation irregularity is minimized.

4. A mounting method for mounting the planetary roller speed changer assembled by the assembly method according to claim 3 to the driven apparatus, the mounting method for the planetary roller speed changer comprising:

mounting the planetary roller speed changer to the driven apparatus, with the spacer in abutting contact with the end surface of the outer ring, and then, pulling out the spacer.

* * * * *